United States Patent
Baek

(10) Patent No.: US 9,099,712 B2
(45) Date of Patent: Aug. 4, 2015

(54) BATTERY PACK

(75) Inventor: Woon-Seong Baek, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 371 days.

(21) Appl. No.: 13/035,674

(22) Filed: Feb. 25, 2011

(65) Prior Publication Data
US 2012/0034514 A1   Feb. 9, 2012

(30) Foreign Application Priority Data
Aug. 9, 2010   (KR) ................. 10-2010-0076628

(51) Int. Cl.
H01M 2/02   (2006.01)
H01M 2/10   (2006.01)

(52) U.S. Cl.
CPC .................... *H01M 2/1061* (2013.01)

(58) Field of Classification Search
None
See application file for complete search history.

(56) References Cited

U.S. PATENT DOCUMENTS

| | | | | |
|---|---|---|---|---|
| 7,361,428 | B2* | 4/2008 | Watanabe et al. | 429/96 |
| 2001/0051298 | A1* | 12/2001 | Hanafusa et al. | 429/162 |
| 2006/0099503 | A1* | 5/2006 | Lee | 429/176 |
| 2007/0154785 | A1* | 7/2007 | Seo et al. | 429/61 |
| 2009/0081485 | A1 | 3/2009 | Heo | |

FOREIGN PATENT DOCUMENTS

| | | |
|---|---|---|
| JP | 2009-021067 | 1/2009 |
| JP | 2010-061998 | 3/2010 |
| JP | 2010-067422 | 3/2010 |
| KR | 1020050088007 | 9/2005 |
| KR | 1020050088008 | 9/2005 |
| KR | 1020070106813 | 11/2007 |
| KR | 10-2009-0031158 | 3/2009 |
| KR | 1020090064773 | 6/2009 |

OTHER PUBLICATIONS

English machine translation of JP 2010-87422A, 2010.*
Office Action dated Nov. 24, 2011 for corresponding KR Application No. 10-2010-0076628.

* cited by examiner

*Primary Examiner* — Patrick Ryan
*Assistant Examiner* — Lucas J O'Donnell
(74) *Attorney, Agent, or Firm* — Knobbe Martens Olson & Bear LLP

(57) ABSTRACT

A battery pack having excellent assembling efficiency and strength against drop impact. The battery pack includes: an electrode assembly; a case that has a space accommodating the electrode assembly and includes a wing portion having a plurality of through-holes in at least one direction of the outer circumference; and a frame that includes a frame body disposed to encompass the outer circumference of the case and a frame coupling unit integrally formed with the frame body and coupling the case to the frame body via the through-holes.

22 Claims, 9 Drawing Sheets

BATTERY PACK

RELATED APPLICATIONS

This application claims the benefit of Korean Patent Application No. 10-2010-0076628, filed on Aug. 9, 2010, in the Korean Intellectual Property Office, the disclosure of which is incorporated herein in its entirety by reference.

BACKGROUND

1. Field

One or more embodiments of the present invention relate to a battery pack, and more particularly, to a battery pack having improved assembly efficiency and strength against drop impact.

2. Description of the Related Art

Generally, unlike primary batteries, which are incapable of being recharged, secondary batteries may be charged and discharged. Secondary batteries are widely used for small-size devices such as cellular phones, personal digital assistants (PDAs), and notebook computers.

Accordingly, secondary batteries must pass a reliability test according to their environment of use. The reliability test includes a temperature-based durability test, a drop test, an electrostatic discharge (ESD) test, a charge and discharge test, or the like.

Among these tests, the drop test influences not only mechanical characteristics but also electrical characteristics of the battery. An external impact caused by drop, or the like, influences operation of a battery. For example, assembled elements of the battery may be separated and electric short-circuit may occur.

SUMMARY

One or more embodiments of the present invention include a battery pack having excellent assembling efficiency and strength against drop impact.

Additional aspects will be set forth in part in the description which follows and, in part, will be apparent from the description, or may be learned by practice of the presented embodiments.

According to one or more embodiments of the present invention, a battery pack includes: an electrode assembly; a case that has a space accommodating the electrode assembly and includes a wing portion having a plurality of through-holes in at least one direction of the outer circumference; and a frame that includes a frame body disposed to encompass the outer circumference of the case and a frame coupling unit integrally formed with the frame body and coupling the case to the frame body via the through-holes.

The case may include: a first lateral wing portion that is bent to surround one side of the case and has a plurality of through-holes; and a second lateral wing portion that is bent to surround the other side of the case and has a plurality of through-holes.

The first lateral wing portion and the second lateral wing portion may be bent in the same direction.

The first lateral wing portion and the second lateral wing portion may be bent in opposite directions.

The case may further include a wing portion that is disposed in a direction where an electrode tap of the electrode assembly extends and has a plurality of through-holes.

The case may include: a first lateral wing portion that is disposed on one side of the case and has a plurality of through-holes; a second lateral wing portion that is disposed on the other side of the case and has a plurality of through-holes; and an upper wing portion that is disposed to be perpendicular to the first and second lateral wing portions and has a plurality of through-holes.

The electrode assembly may include an electrode tap that externally extends from the upper wing portion.

The first lateral wing portion and the second lateral wing portion may be bent to surround sides of the case.

The first lateral wing portion and the second lateral wing portion may be bent in the same direction.

The first lateral wing portion and the second lateral wing portion may be bent in different directions.

The frame may be formed while a molding resin that is filled in the through-holes is cured.

The frame coupling unit may be inserted into the through-holes to couple the frame body to the case.

The frame coupling unit may include: a pillar portion that is inserted into the through-hole; and a hook portion that is integrally formed with the pillar portion and includes a hook that passes through the through-hole to contact the wing portions.

One end of the hook portion is incised in a lengthwise direction.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1:
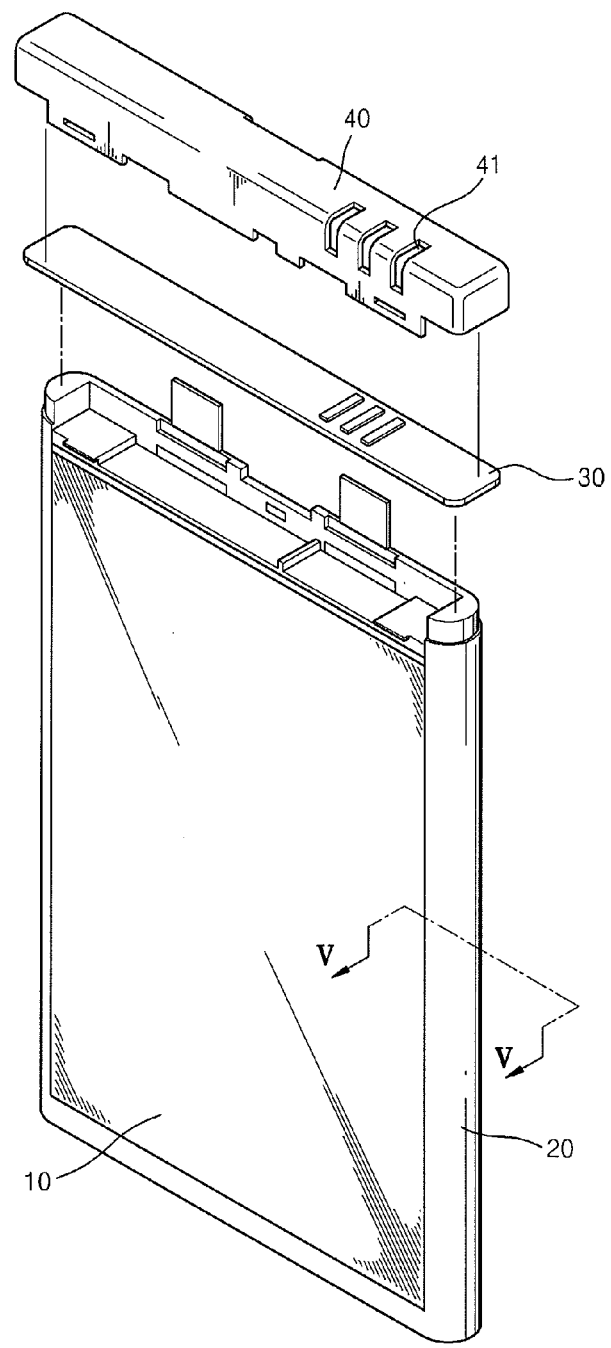
FIG. 1 is a schematic exploded perspective view of a battery pack according to an embodiment of the present invention.

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description.

The terms used in the present specification are used to describe embodiments of the inventive concept, and not to limit the inventive concept. Throughout the specification, a singular form may include plural forms, unless there is a particular description contrary thereto. Also, terms such as "comprise" or "comprising" are used to specify existence of a recited form, a number, a process, an operations, a component, and/or groups thereof, not excluding the existence of one or more other recited forms, one or more other numbers, one or more other processes, one or more other operations, one or more other components and/or groups thereof. While such terms as "first," "second," etc., may be used to describe various components, such components must not be limited to the above terms. The above terms are used only to distinguish one component from another.

FIG. 1 is a schematic exploded perspective view of a battery pack according to an embodiment of the present invention. Referring to FIG. 1, the battery pack includes a battery cell 10, a frame 20 disposed to encompass the battery cell 10, a protective circuit module 30, and a cap assembly 40.

The battery cell 10 includes an electrode assembly 200 and a case 100 accommodating the electrode assembly 200. The battery cell 10 may be manufactured as a rectangular or pouch form. Electrode taps (anode tap and cathode tap) 241 and 242 extend from the battery cell 10 in one direction, e.g., from the upper surface of the battery cell 10.

The frame 20 includes a frame body 21 that is disposed to encompass the outer circumference of the battery cell 10 and a frame coupling unit 22 that mechanically couples the battery cell 10 with the frame body 21. The frame 20 may be formed of an insulating resin. Alternatively, the frame 20 may be formed of an elastic material so that a drop impact on the battery pack may be alleviated.

Although the frame 20 encompasses the outer circumference of the battery cell 10 herein, the present embodiment is not limited thereto. For example, the frame 20 may be disposed to encompass the entire surface of the battery cell 10.

The protective circuit module 30 prevents overheating and explosion of the battery cell 10 caused by overcharge, overdischarge, or overcurrent. A protection element (not shown) may selectively include a safety element such as a passive element, e.g., a resistor or a capacitor and an active element, e.g., a field effect transistor (FET), and integrated circuits, and may include a protective circuit module element.

The cap assembly 40 accommodates the protective circuit module 30, covers the upper portion of the battery cell 10, and includes a connector 41 that is electrically connected to an electrode terminal of an external device (not shown).

Figure 2:
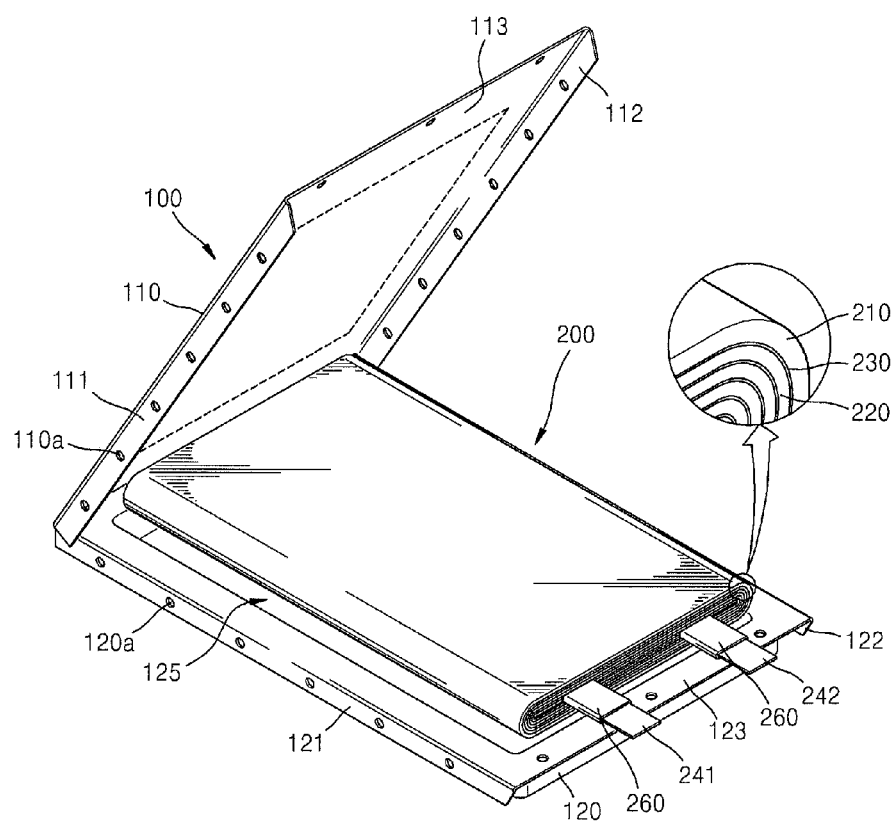
FIG. 2 is a schematic exploded perspective view of the battery cell of FIG. 1.
Figure 3:
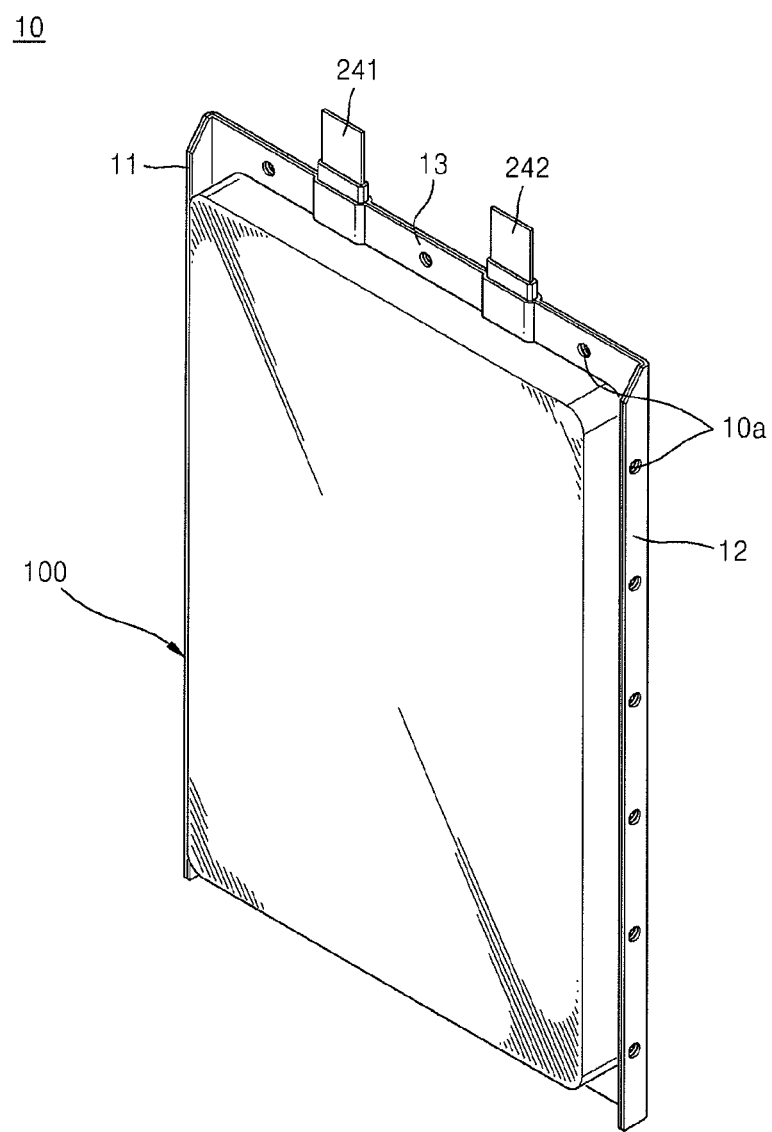
FIG. 3 is a schematic perspective view of the battery cell of FIG. 2.

FIG. 2 is a schematic exploded perspective view of the battery cell of FIG. 1. FIG. 3 is a schematic perspective view of the battery cell of FIG. 2 which is assembled. Referring to FIGS. 2 and 3, the battery cell 10 includes an electrode assembly 200 and a case 100.

The electrode assembly 200 may be prepared by stacking a anode plate 210 coated with a slurry for forming a anode including a anode active material, an cathode plate 220 coated with a slurry for forming an cathode including an cathode active material, and a separator 230 interposed between the anode plate 210 and the cathode plate 220 and winding the stack. The separator 230 inhibits electrical short-circuit between the anode plate 210 and the cathode plate 220.

The anode tap 241 and the cathode tap 242, as a pair, are electrically connected to the protective circuit module 30. A portion of the anode and cathode taps 241 and 242 externally protrudes from the case 100 as shown in FIG. 2. An adhesive tape 260 may be applied to a portion where the anode and cathode taps 241 and 242 contact the case 100 for a strong sealing between the case 100 and the anode and cathode 241 and 242. The adhesive tape 260 surrounds the anode and cathode taps 241 and 242.

The case 100 includes a second case unit 120 accommodating the electrode assembly 200 and a first case unit 110 sealing the electrode assembly 200. The second case unit 120 has an accommodating space 125 for accommodating the electrode assembly 200.

Edges of the first case unit 110 and the second case unit 120 may be integrally adhered to each other. The edges of the first case unit 110 and the second case unit 120 may be adhered to each other by thermal bonding, or the like. The adhered edges form a wing portion of the battery cell 10. That is, lateral edges 111 and 112 of the first case unit 110 is adhered to lateral edges 121 and 122 of the second case unit 120 to form first and second wing portions 11 and 12 or extension members of the battery cell 10. In addition, an upper edge 113 of the first case unit 110 is adhered to an upper edge 123 of the second case unit 120 to form an upper wing portion 13 of the battery cell 10.

The edges 111, 112, 113, 121, 122, and 123 of the first case unit 110 and the second case unit 120 have holes 110a and 120a corresponding to each other.

Referring to FIG. 3, the first lateral wing portion 11 and the second lateral wing portion 12 are bent to surround sides of the battery cell 10. The first and second lateral wing portions 11 and 12 may be bent to be parallel to the sides of the case 100. Alternatively, the first and second lateral wing portions 11 and 12 may further be bent so as to contact the sides of the case 100.

The upper wing portion 13 is disposed to be perpendicular to the first and second lateral wing portions 11 and 12. The anode and cathode taps 241 and 242 of the electrode assembly 200 may extend from the upper wing portion 13.

The first lateral wing portion 11, the second wing portion 12, and the upper wing portion 13 have a plurality of through-holes 10a, respectively. The frame 20 and the battery cell 10 are mechanically coupled by the through-holes 10a.

Although the first and second wing portions 11 and 12 and the upper wing portion 13 have the through-holes 10a herein, but the present embodiment is not limited thereto. For example, only the first and second wing portions 11 and 12 of the battery cell 10 may have the through-holes 10a.

Figure 4:
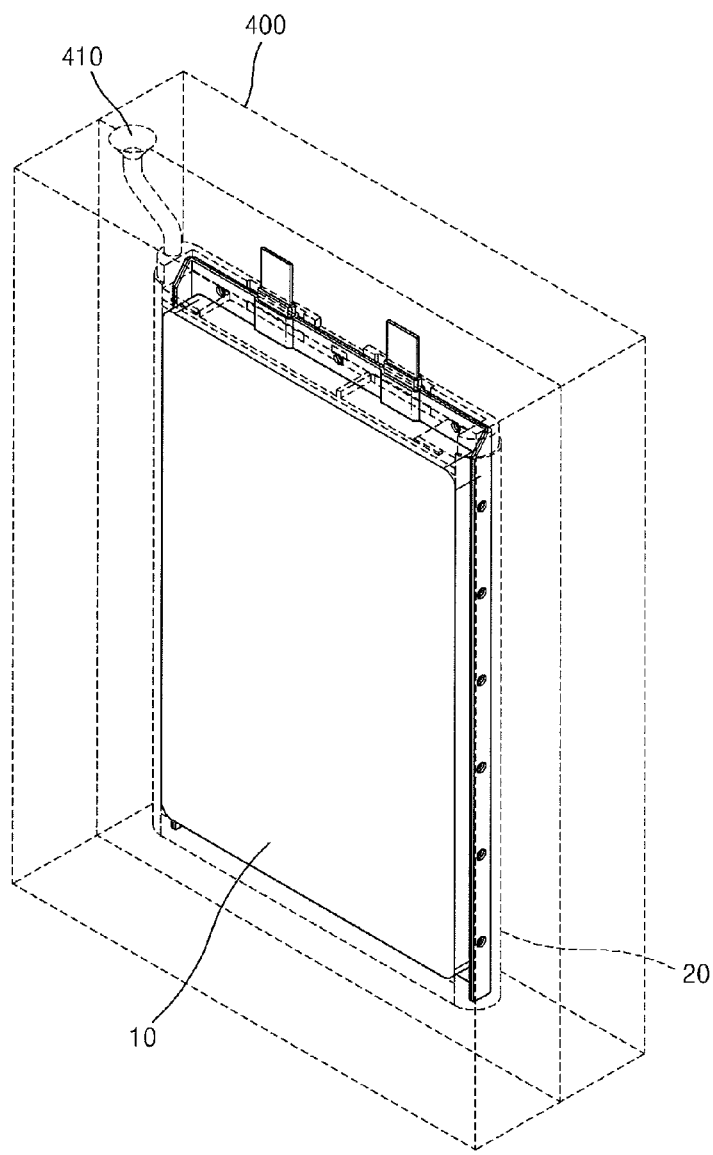
FIG. 4 is a schematic perspective view for describing a coupling process of a battery cell and a frame.
Figure 5:
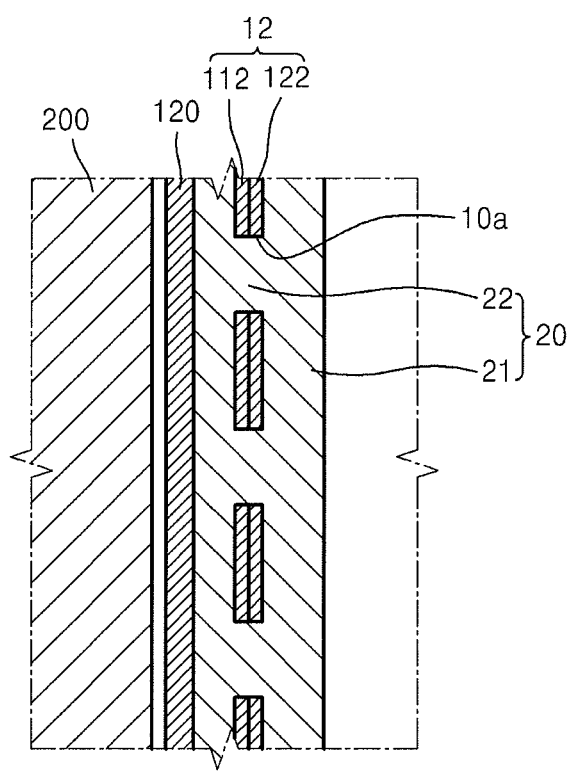
FIG. 5 is a cross-sectional view of the battery pack of FIG. 1 taken along a line V-V illustrating a portion where a case of the battery cell and the frame are coupled.

FIG. 4 is a schematic perspective view for describing a coupling process of a battery cell and a frame. FIG. 5 is a cross-sectional view of the battery pack of FIG. 1 taken along a line V-V illustrating a coupled state of a case of the battery cell and a frame. According to the present embodiment, the battery cell 10 is coupled to the frame 20 while a molding resin for forming the frame 20 is filled in the through-holes of the battery cell 10.

Referring to FIG. 4, a mold 400 is installed around the battery cell 10, and a molding resin is injected into the mold 400 via an inlet 410. The molding resin may include phenol resins, urea resins, unsaturated polyester resins, epoxy resins, liquid rubber, anaerobic resins, UV-curable resins, and room temperature-curable resins for casting.

The injected molding resin that is flowable fills the through-holes 10a of the battery cell 10. Then, while the molding resin is cured, the frame 20 is formed and the frame 20 is coupled to the battery cell 10, simultaneously. When the mold 400 is removed, the battery cell 10 surrounded by the frame 20 is prepared as shown in FIG. 1.

Referring to FIG. 5, while the molding resin is cured, the frame body 21 that encompasses the sides of the battery cell 10 having the through-holes 10a and the frame coupling unit 22 that fills and passes the through-hole 10a are formed. In addition, the space formed between the second case unit 120 of the battery cell 10 and the second lateral wing portion 12, and the through-holes 10*a* are filled with the molding resin. Since the battery cell 10 and the frame 20 are coupled to each other when the frame 20 is formed, the battery cell 10 and the frame 20 are less likely to be separated from each other by drop or external impact. As such, the battery cell 10 is encompassed with the molding resin and more firmly coupled to the molding resin.

Figure 6:
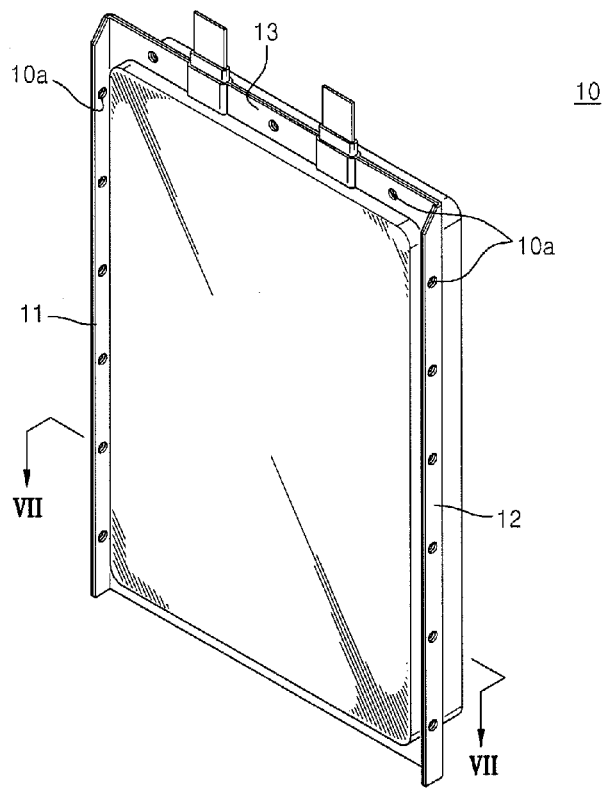
FIG. 6 is a schematic perspective view of a battery cell according to another embodiment of the present invention.
Figure 7:
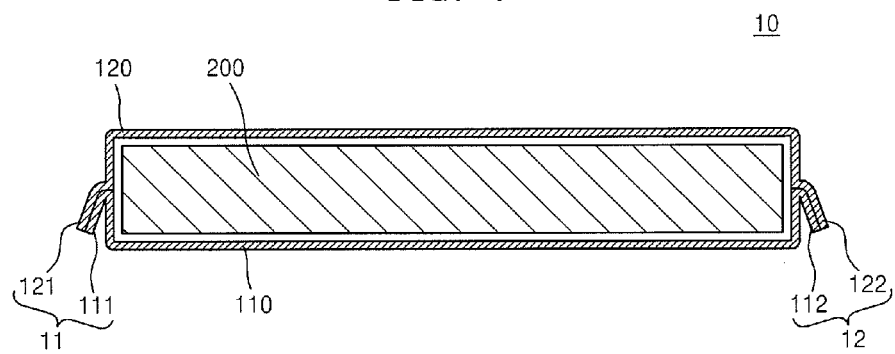
FIG. 7 is a cross-sectional view taken along a line VII-VII of FIG. 6.

FIG. 6 is a schematic perspective view of a battery cell according to another embodiment of the present invention. FIG. 7 is a cross-sectional view taken along a line VII-VII of FIG. 6.

The present embodiment is different from the previous embodiment described with reference to FIGS. 2 and 3, in that accommodating spaces are respectively formed in the first case unit 110 and the second case unit 120. In other words, the first case unit 110 has an accommodating space for one portion of the electrode assembly 200, and the second case unit 120 has an accommodating space for the other portion of the electrode assembly 200. Accordingly, the first lateral wing portion 11 and the second lateral wing portion 12 are bent to surround from the center to one end of sides of the battery cell 10. The first lateral wing portion 11 and the second lateral wing portion 12 are bent in the same direction. In addition, the upper wing portion 13 may be disposed at the center of the upper surface of the battery cell 10.

Figure 8:
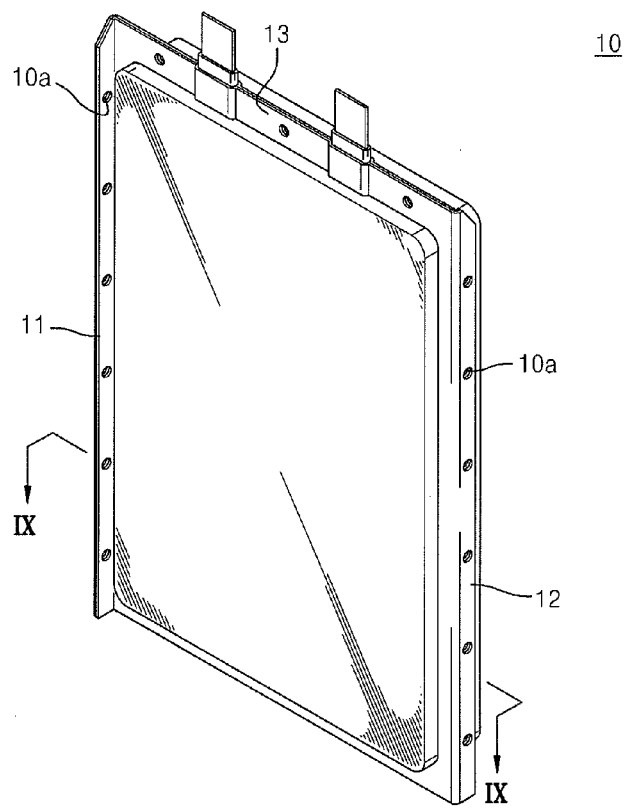
FIG. 8 is a schematic perspective view of a battery cell according to another embodiment of the present invention.
Figure 9:
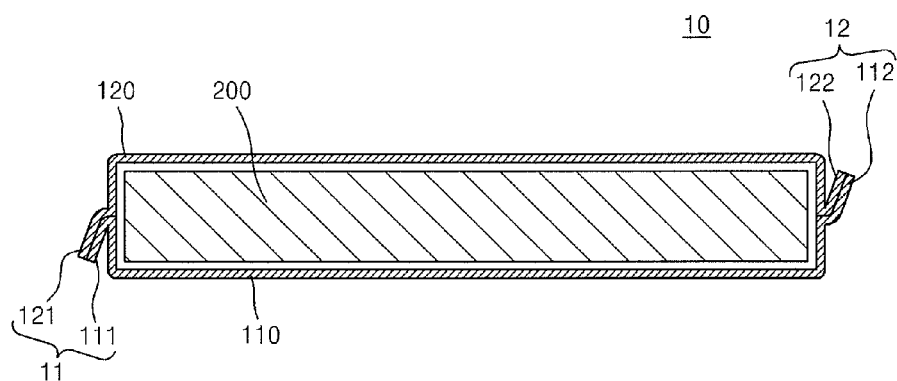
FIG. 9 is a cross-sectional view taken along a line IX-IX of FIG. 8.

FIG. 8 is a schematic perspective view of a battery cell according to another embodiment of the present invention. FIG. 9 is a cross-sectional view taken along a line IX-IX of FIG. 8.

The present embodiment is different from the previous embodiment described with reference to FIGS. 6 and 7, in that the first lateral wing portion 11 and the second lateral wing portion 12 are bent in opposite directions.

Both of the first lateral wing portion 11 and the second lateral wing portion 12 are bent to surround sides of the battery cell 10. However, the first lateral wing portion 11 and the second lateral wing portion 12 are bend in opposite directions, so that the frame 20 and the battery cell 10 may be more stably coupled to each other. In other words, the frame 20 supports both sides of the battery cell 10 in opposite directions, so that the frame 20 and the battery cell 10 may be stably coupled to each other. Thus, the separation of the frame 20 from the battery cell 10 may be efficiently inhibited even when an external impact is applied to the battery pack.

Figure 10:
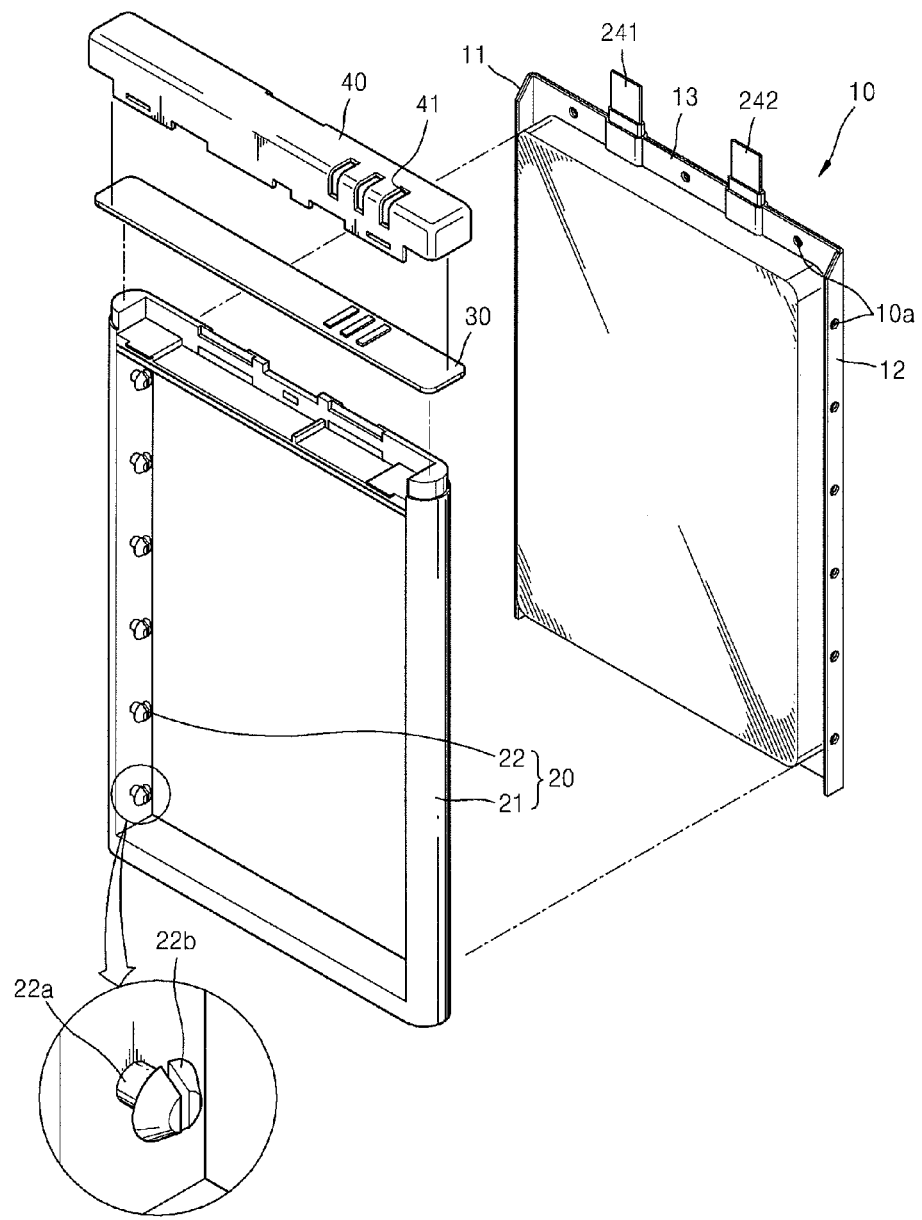
FIG. 10 is a schematic exploded perspective view of a battery pack according to another embodiment of the present invention.

FIG. 10 is a schematic exploded perspective view of a battery pack according to another embodiment of the present invention.

Referring to FIG. 10, the battery pack according to the present embodiment includes a battery cell 10, a frame 20 disposed to encompass the battery cell 10 and coupled to the battery cell 10, a protective circuit module 30, and a cap assembly 40. The frame 20 is coupled to the battery cell in a different manner according to the present embodiment.

The frame 20 includes a frame body 21 that is disposed to encompass the outer circumference of the battery cell 10 and a frame coupling unit 22 that mechanically couples the battery cell 10 to the frame body 21. In this regard, the frame 20 is an injection-molded frame that is separately prepared. That is, the frame 20 is prepared and then coupled with the battery cell 10 using a method that is different from that described with reference to FIGS. 4 and 5.

As shown in an enlarged view in FIG. 10, the frame coupling unit 22 includes a pillar portion 22*a* that is inserted into the through-hole 10*a* and a hook portion 22*b* that is integrally formed with the pillar portion 22*a* and includes a hook that passes through the through-hole 10*a* to contact the first and second lateral wing portions 11 and 12 of the battery cell 10.

One end of the hook portion 22*b* is incised in a lengthwise direction. The hook portion 22*a* may easily pass through the through-hole 10*a* since it is incised into at least two parts.

Figure 11:
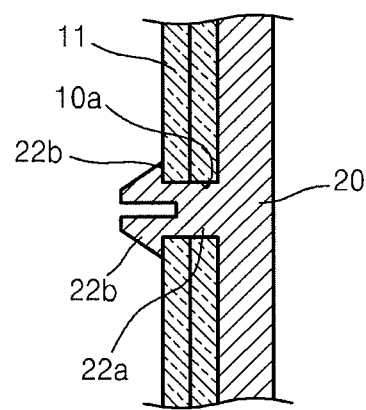
FIG. 11 is a schematic cross-sectional view of a portion where a case of a battery cell and a frame are coupled.

FIG. 11 is a schematic cross-sectional view of a portion where the battery cell 10 and the frame 20 are coupled to illustrate a coupling state between the first lateral wing portion 11 of the battery cell 10 and the frame 20. Referring to FIG. 11, the pillar portion of the frame coupling unit 22 is inserted into the through-hole 10*a*, and the hook portion 22*b* is fixed to the first lateral wing portion 11 of the case unit 120 of the battery cell 10 by passing through the through-hole 10*a* and contacting the first lateral wing portion 11. Since a radius of the hook portion 22*b* is greater than that of the through-hole 10*a*, the battery cell 10 may be coupled to the frame 20.

The side of the hook portion 22*b* is inclined. Thus, when the frame coupling unit 22 is inserted into the through-hole 10*a*, the through-hole 10*a* pushes the slope of the hook portion 22*b* to contract the hook portion 22*b*. If this is continued, the hook portion 22*b* slips out of the through-hole 10*a* and return to its original shape by a force of restitution. Then, the hook portion 22*b* contacts the first lateral wing portion 11 to be fixed thereto.

The hook portion 22*b* is incised herein, but the present embodiment is not limited thereto. For example, the hook portion 22*b* may not be incised. In this case, the hook portion 22*b* is forcibly inserted into the through-hole 10*a*.

As described above, the battery cell 10 and the frame 20 are coupled safely and firmly via the through-holes 10*a* of the case 100 of the battery cell 10. Accordingly, the frame 20 is less likely to be separated from the battery cell 10 by an external impact. Such effect may be improved by the curing process of the molding resin that flows into the through-holes 10*a* or by the structure of the frame coupling unit 22 including the hook portion 22*b*. Therefore, the battery pack has better strength against drop impact without a further external frame or metal reinforcing member.

As described above, according to the one or more of the above embodiments of the present invention, since the battery cell is firmly coupled to the frame, the battery cell is not separated from the frame by an external impact such as drop impact and has a simple structure to be used to manufacture the battery pack.

It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:
1. A battery pack comprising:
an electrode assembly;
a case comprising a first case unit and a second case unit each having an outer circumference wherein the case has a space accommodating the electrode assembly and wherein the first case unit and the second case unit each comprises a wing portion having a plurality of through-holes in at least one direction of the outer circumference wherein the plurality of through-holes in the first case unit and the second case unit are aligned so that each aligned set of through-holes defines a single opening having a depth at least equal to the combined thicknesses of the wing portions of the first and second case units when the electrode assembly is secured within the case unit; and a frame that comprises a frame body disposed to encompass the outer circumference of the case and a frame coupling unit integrally formed with the frame body and coupling the case to the frame body via the frame coupling units extending through the single openings defined by the aligned through-holes in both the first and second case units.

2. The battery pack of claim 1, wherein the case comprises:
a first lateral wing portion that is bent to surround one side of the case and has a plurality of through-holes; and
a second lateral wing portion that is bent to surround the other side of the case and has a plurality of through-holes.

3. The battery pack of claim 2, wherein the first lateral wing portion and the second lateral wing portion are bent in the same direction.

4. The battery pack of claim 2, wherein the first lateral wing portion and the second lateral wing portion are bent in opposite directions.

5. The battery pack of claim 2, wherein the case further comprises a wing portion that is disposed in a direction where an electrode tap of the electrode assembly extends and has a plurality of through-holes.

6. The battery pack of claim 1, wherein the case comprises:
a first lateral wing portion that is disposed on one side of the case and has a plurality of through-holes;
a second lateral wing portion that is disposed on the other side of the case and has a plurality of through-holes; and
an upper wing portion that is disposed to be perpendicular to the first and second lateral wing portions and has a plurality of through-holes.

7. The battery pack of claim 6, wherein the electrode assembly comprises an electrode tap that externally extends from the upper wing portion.

8. The battery pack of claim 6, wherein the first lateral wing portion and the second lateral wing portion are bent to surround sides of the case.

9. The battery pack of claim 8, wherein the first lateral wing portion and the second lateral wing portion are bent in the same direction.

10. The battery pack of claim 8, wherein the first lateral wing portion and the second lateral wing portion are bent in different directions.

11. The battery pack of claim 1, wherein the frame is formed while a molding resin that is filled in the through-holes is cured.

12. The battery pack of claim 1, wherein the frame coupling unit is inserted into the through-holes to couple the frame body to the case.

13. The battery pack of claim 1, wherein the frame coupling unit comprises:
a pillar portion that is inserted into the through-hole; and
a hook portion that is integrally formed with the pillar portion and comprises a hook that passes through the through-hole to contact the wing portions.

14. The battery pack of claim 13, wherein one end of the hook portion is incised in a lengthwise direction.

15. A battery pack comprising:
an electrode assembly;
a case comprising a first case unit and a second case unit wherein the case receives the electrode assembly wherein the first and second case units defines at least two opposed side;
at least one extension member that extends outward from at least one of the two opposed sidewalls of both the first and second case units, wherein the at least one extension member includes a plurality of holes that extend therethrough and wherein the plurality of holes are aligned so that each aligned set of holes defines a single opening when the electrode assembly is secured within the case wherein the single opening has a depth at least equal to the combined thicknesses of the extension member of the first and second case units; and
a frame that encompasses the case, wherein the frame includes coupling portions that engage with the plurality of holes so as to extend through the single openings defined by the plurality of aligned holes in the at least one extension member of both the first and second case units to secure the frame to the case.

16. The battery pack of claim 15, wherein the at least one extension member comprises a first and a second extension member that extend outward from two of the opposed sidewalls of the case.

17. The battery pack of claim 16, wherein the first and second extension members are bent so as to extend outward at an angle from the opposed sidewalls of the case.

18. The battery pack of claim 17, wherein the first and second extension members are bent in the same direction.

19. The battery pack of claim 15, wherein the frame comprises a resin material and wherein the coupling portions are formed of the resin material that is cured in the holes of the at least one extension member to secure the frame to the case.

20. The battery pack of claim 15, wherein the coupling portions comprise discrete elements that are coupled to the frame and extend through the plurality of holes.

21. The battery pack of claim 20, wherein the discrete elements include a pillar portion that is inserted into hole and a hook portion that is integrally formed with the pillar portion and comprises a hook that passes through the hole to contact the at least one extension.

22. The battery pack of claim 21, wherein one end of the hook portion is incised in a lengthwise direction.

* * * * *